US009035622B2

(12) United States Patent
Huang

(10) Patent No.: US 9,035,622 B2
(45) Date of Patent: May 19, 2015

(54) CHARGING DEVICE WITH BATTERY MANAGEMENT SYSTEM FOR RECHARGEABLE BATTERY

(75) Inventor: Pao-Sheng Huang, MiaoLi County (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 369 days.

(21) Appl. No.: 13/528,885

(22) Filed: Jun. 21, 2012

(65) Prior Publication Data
US 2013/0342172 A1    Dec. 26, 2013

(51) Int. Cl.
*H02J 7/00*    (2006.01)
*H02J 7/04*    (2006.01)

(52) U.S. Cl.
CPC ........ *H02J 7/045* (2013.01); *H02J 7/041* (2013.01)

(58) Field of Classification Search
CPC ...... H01M 10/44; H02J 7/0052; H02J 7/0057
USPC .................. 320/101, 118, 136, 162
See application file for complete search history.

(56) References Cited

U.S. PATENT DOCUMENTS

| 5,760,568 | A * | 6/1998 | Naskali ................ 320/139 |
| 7,012,405 | B2 * | 3/2006 | Nishida et al. ........... 320/137 |
| 7,884,578 | B2 * | 2/2011 | Hashimoto et al. .......... 320/159 |
| 8,084,995 | B2 * | 12/2011 | Wei ................ 320/130 |
| 8,159,191 | B2 * | 4/2012 | Chang et al. ........... 320/136 |
| 8,179,139 | B2 * | 5/2012 | Kawasumi et al. .......... 324/430 |
| 8,535,831 | B2 * | 9/2013 | Tsukamoto et al. .......... 429/225 |
| 2009/0091295 | A1 * | 4/2009 | Wan ................ 320/134 |
| 2010/0253278 | A1 * | 10/2010 | Chang et al. ............ 320/101 |

FOREIGN PATENT DOCUMENTS

| JP | 2000166102 | 6/2000 |
| TW | I324410 B | 5/2010 |

OTHER PUBLICATIONS

English Translation of Taiwanese Patent Application Publication TWI324410 (May 1, 2010).*
Office Action issued in the Corresponding Taiwan Patent Application 101125968, dated Apr. 16, 2014.
Office action issued by Taiwanese patent office on Nov. 24, 2014, for the US counterpart case.

* cited by examiner

*Primary Examiner* — Sun Lin
(74) *Attorney, Agent, or Firm* — Che-Yang Chen; Law Office of Michael Chen

(57) ABSTRACT

A charging device with a battery management system which remains a rechargeable battery in full capacity during standby after being fully charged is disclosed. The charging device includes a charging module, electrically connected to a power source, for charging the rechargeable battery; a voltage detecting module, for detecting a voltage of the rechargeable battery; and a determination module, for instructing the charging module to charge the rechargeable battery with a supplementary current, when the voltage of the rechargeable battery detected by the voltage detecting module reduces to a first predetermined voltage, until the voltage of the rechargeable battery reaches a second predetermined voltage. A reduction of the voltage of the rechargeable battery is due to self-discharge of the rechargeable battery during standby after being fully charged.

4 Claims, 4 Drawing Sheets

CHARGING DEVICE WITH BATTERY MANAGEMENT SYSTEM FOR RECHARGEABLE BATTERY

FIELD OF THE INVENTION

The present invention relates to a charging device for a rechargeable battery. More particularly, the present invention relates to a charging device with a battery management system for a rechargeable battery which remains a rechargeable battery in full capacity during standby after being fully charged.

BACKGROUND OF THE INVENTION

Since batteries are electrochemical devices, their performance gradually decreases over time. Premature wear-out means higher costs in terms of replacement labor and shorter service cycle. A worn battery entails a risk of unexpected load loss. In normal operation, the battery "wearing" rate depends strongly on how the full charge is being maintained. Excess charging is detrimental under any operating circumstances.

The Li-ion charger is a voltage-limiting device that is similar to the lead acid system. The difference lies in a higher voltage per cell, tighter voltage tolerance and the absence of trickle or float charge at full charge. While lead acid offers some flexibility in terms of voltage cut-off, manufacturers of Li-ion cells are very strict on the correct setting because Li-ion cannot accept overcharge. Li-ion is a "clean" system and only takes what it can absorb. Anything extra causes stress.

Most cells charge to 4.20V/cell with a tolerance of +/−50 mV/cell. Higher voltages could increase the capacity, but the resulting cell oxidation would reduce service life. More important is the safety concern if charging beyond 4.20V/cell.

Battery chargers for rechargeable batteries, especially for lithium batteries, generally have three charge stages. The first charge stage is a trigger charge stage. The second charge stage is a constant current model stage. The third charge stage is a constant voltage model stage. From the perspective of electronic technology for rechargeable batteries, the first charge stage is a limited current charge stage. The second charge stage is a high constant current stage. The third charge stage is a low constant voltage stage. Transition between the second charge stage and the third charge stage is determined by a charge current. When a current is larger than the charge current, it stays in the second charge stage; when the current is smaller than the charge current, it stays in the third charge stage. The charge current is also called switching current or transition current.

Please refer to FIG. 1. FIG. 1 shows a relation of current (I) and voltage (V) with time when the rechargeable battery is under charging. Variation of current is illustrated by a dashed line and variation of voltage is illustrated by a solid line. The first charge stage is from 0 to t1, the second charge stage is from t1 to t2, and the third charge stage is from t2 to t3. After t3, the rechargeable battery is no longer charged. In the first charge stage, the current keeps the same while the voltage increases in a roughly linear relationship with time. In the second charge stage, the current increases significantly and keeps at a constant value. Meanwhile, the voltage still increases but the rate decreases with time. When the rechargeable battery steps into the third charge stage, the current drops with time, and the voltage remains the same. The rechargeable battery is charged until a cut-off current met at t3. Since no current is inputted into the rechargeable battery after t3, the rechargeable battery will naturally decrease the voltage as well as the power stored inside.

Generally, chargers are set to have a cut-off point by the cut-off current mentioned above after t3 (completed time of the third charge stage) to protect the rechargeable battery from being over charged. It means that after the cut-off point on FIG. 1, no charge process is carried on. All rechargeable batteries have the same characteristics to discharge themselves. If a rechargeable battery is under discharge situation for a long time without power supply (recharge), capacity of the rechargeable battery will decrease. As shown in FIG. 1, the voltage after t3 decreases. It causes not only low power capacity, but also low life time and low battery capacity.

Traditionally, a charging control system for lithium battery detects the current voltage of a charging lithium battery by a voltage detector and passes this voltage value to a microprocessor, which pre-exist in the hand-held apparatus. Thus, the microprocessor can decides the applicable charge stage and confirms the status of the charging battery depending on the different voltage values in real time. Next, the microprocessor controls a control unit by a pulse width modulation signal to modulate the power-source, which comes from an adaptor, as a constant current or a constant voltage to charge the battery. Accordingly, the charge process completed by repeat the voltage detection and the duty cycle modulation of the control unit. However, although the charging control system has convenient charging arrangement to get the rechargeable battery charged by detecting current power capacity, it still fails to control battery capacity if the rechargeable battery is fully charged.

Hence, a charging device for remaining a rechargeable battery in full capacity during standby after being fully charged is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a charging device with battery management system for a rechargeable battery includes a charging module, electrically connected to a power source, for charging the rechargeable battery; a voltage detecting module, for detecting a voltage of the rechargeable battery; and a determination module, for instructing the charging module to charge the rechargeable battery with a supplementary current when the voltage of the rechargeable battery detected by the voltage detecting module reduces to a first predetermined voltage until the voltage of the rechargeable battery reaches a second predetermined voltage. Reduce of the voltage of the rechargeable battery is due to self-discharge of the rechargeable battery during standby after being fully charged.

Preferably, the rechargeable battery is a lithium battery.

Preferably, the second predetermined voltage is equal to the voltage of the rechargeable battery while fully charged.

Preferably, the charging device further includes a power factor correction (PFC) circuit connected between the power source and the charging module, for minimizing the input current distortion and making the current in phase with the voltage.

Preferably, the supplementary current has a maximum value smaller than that of a current which is provided to the rechargeable battery before the rechargeable battery is fully charged.

DETAILED DESCRIPTION OF THE PREFERRED EMBODIMENT

The present invention will now be described more specifically with reference to the following embodiment.

Figure 2:
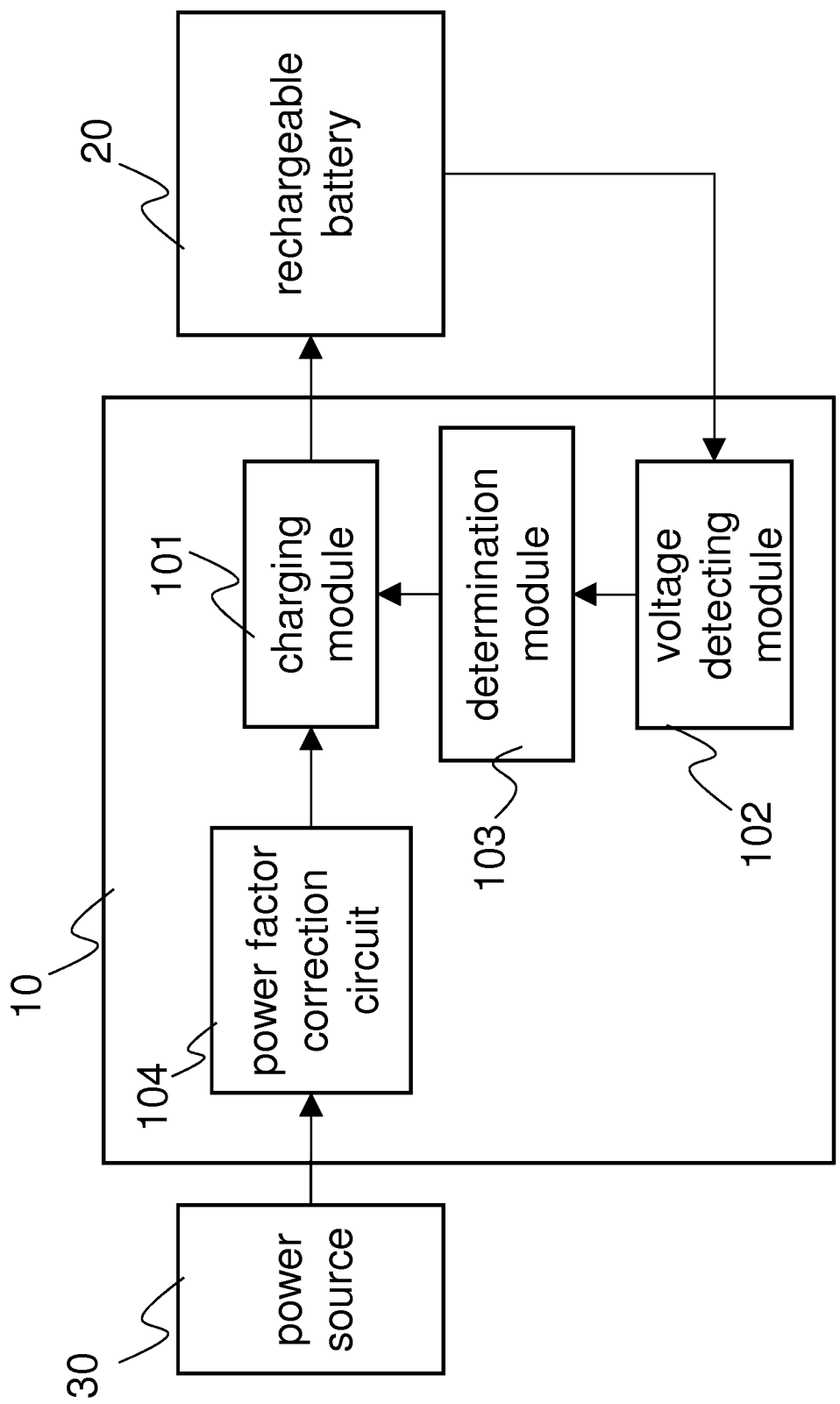
FIG. 2 illustrates a schematic diagram of a preferred embodiment of the present invention.
Figure 3:
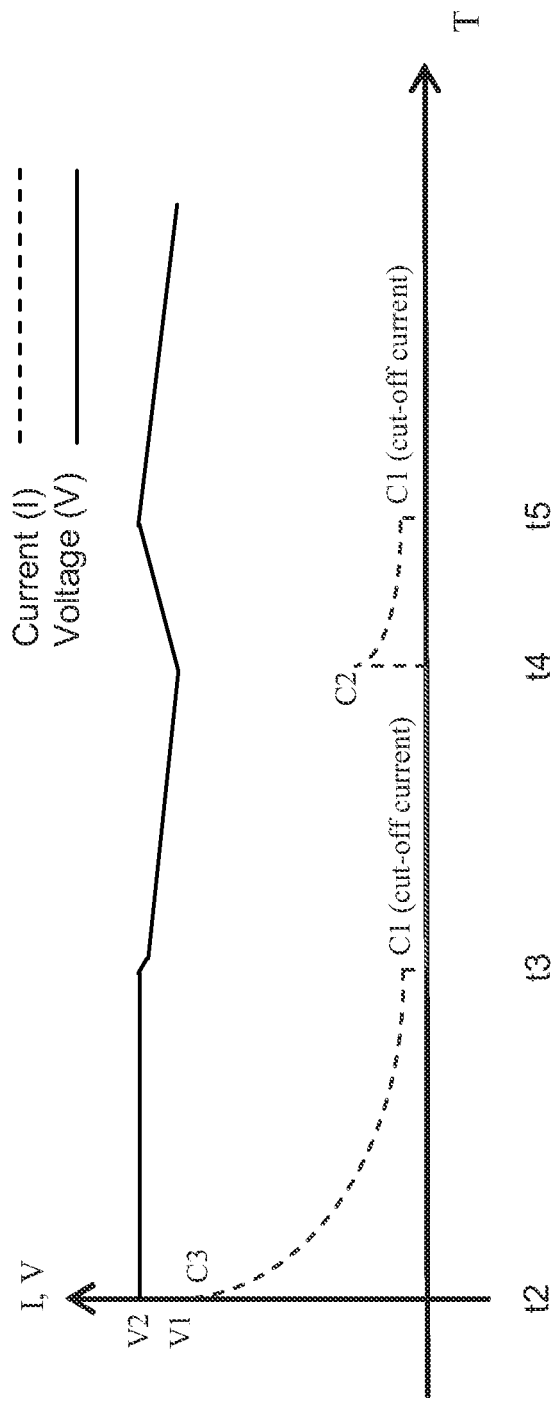
FIG. 3 and FIG. 4 show a relation of current (I) and voltage (V) with time of a rechargeable battery according to the preferred embodiment of the present invention.
Figure 4:
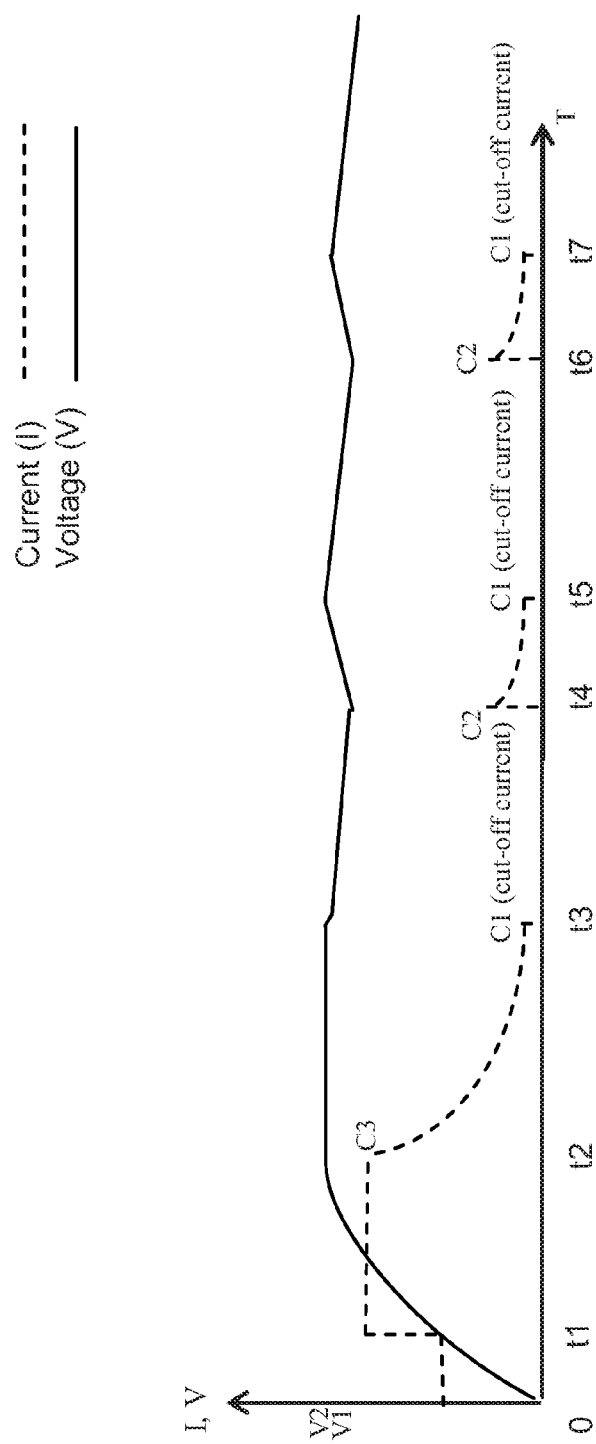

Please refer to FIG. 2 to FIG. 4. A preferred embodiment according to the present invention is described. FIG. 2 illustrates a schematic diagram of a charging device 10 with battery management system for a rechargeable battery 20 according to the present embodiment. FIGS. 3 and 4 show a relation of current (I) and voltage (V) with time of the rechargeable battery 20 according to the present invention.

In this embodiment, the rechargeable battery 20 is a lithium battery. It should be understood that the rechargeable battery 20 is not limited to be lithium battery, lead-acid battery can also be used. As aforementioned, traditional chargers sets a cut-off point after a rechargeable battery is fully charged to protect the rechargeable battery from being over charged. Meaning that the rechargeable battery will not be charged after the cut-off point. However, rechargeable batteries will automatically discharge during standby causing the capacity of the rechargeable battery to decrease. Hence, the main aspect of the present invention is to provide a charging device which can remain a rechargeable battery in full capacity during standby after being fully charged.

The charging device 10 includes a charging module 101, a voltage detecting module 102 and a determination module 103. The charging module 101 is electrically connected to a power source 30 and is used for charging the rechargeable battery 20. In this embodiment, the power source 30 provides direct current (DC). In practice, the charging device 10 can include an AC-DC converter for converting alternating current (AC) into DC before power is provided to the charging module 101.

The voltage detecting module 102 is connected to the rechargeable battery 20 for detecting and monitoring a voltage of the rechargeable battery 20.

The determination module 103 is connected to the charging module 101 and the voltage detecting module 102. The determination module 103 determines whether to charge the rechargeable battery 20 or not. If the voltage of the rechargeable battery 20 detected by the voltage detecting module 102 reduces to a first predetermined voltage $V_1$, then the determination module 103 will instruct the charging module 101 to charge the rechargeable battery 20 with a supplementary current $C_2$ until the voltage of the rechargeable battery 20 reaches a second predetermined voltage $V_2$. As aforementioned, reduce of the voltage of the rechargeable battery 20 is mainly due to self-discharge of the rechargeable battery 20 during standby after being fully charged.

According to the present embodiment, the second predetermined voltage $V_2$ is equal to the voltage of the rechargeable battery 20 while fully charged. In other words, the second predetermined voltage $V_2$ is equal to the voltage of the rechargeable battery 20 at cut-off current $C_1$. However, the second predetermined voltage $V_2$ can also be set to a voltage slightly lower than that of the rechargeable battery 20 while fully charged to prevent the rechargeable battery 20 from being over-charged. The first predetermined voltage $V_1$ can be set at a voltage 10% lower than that of the rechargeable battery 20 while fully charged.

Figure 1:
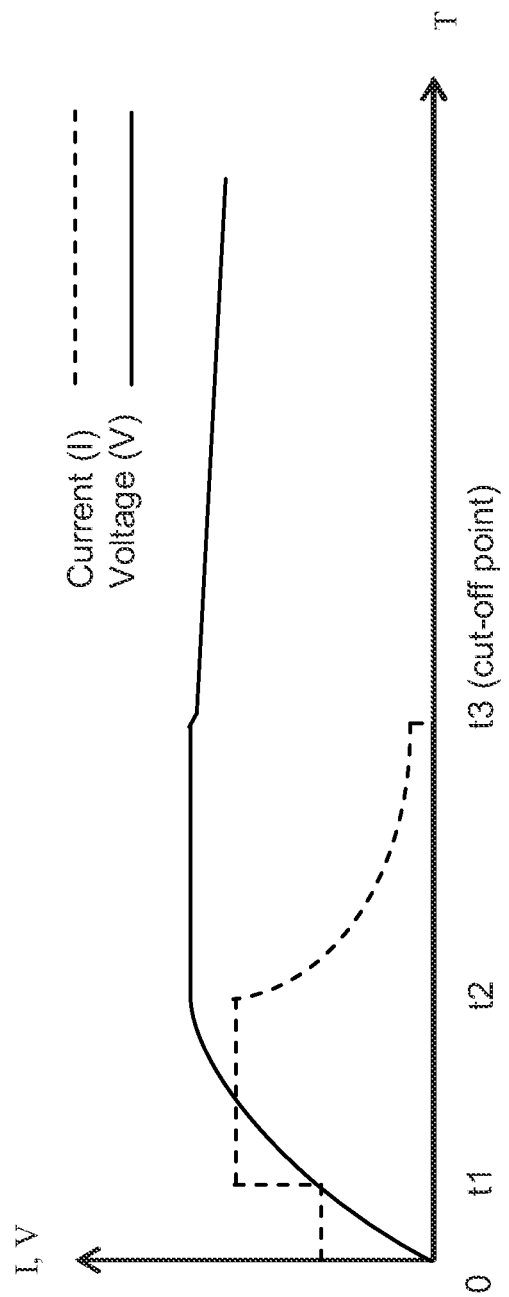
FIG. 1 shows a relation of current (I) and voltage (V) with time when the rechargeable battery is under charging.

Please refer to FIG. 3 which starts from t2 of FIG. 1. Cut-off current $C_1$ is the current provided in the third charge stage of FIG. 1. The cut-off current $C_1$ is the minimum current that the charging module 101 provides to the rechargeable battery 20. The charging module 101 stops supplying power to the rechargeable battery 20 when current in the third charge stage drops to the cut-off current at t3. At t3, the rechargeable battery 20 has a voltage of $V_2$.

The rechargeable battery 20 is not charged after t3 until t4 when the voltage of the rechargeable battery 20 drops to $V_1$, then a supplementary current $C_2$ is provided to the rechargeable battery 20 such that the voltage of the rechargeable battery 20 can increase from $V_1$ to $V_2$. During the increase of the voltage, the supplementary current $C_2$ provided to the rechargeable battery 20 slightly reduces through time until the supplementary current $C_2$ is reduced to the cut-off current $C_1$ and the voltage of the rechargeable battery 20 is increased to $V_2$ (t5). Preferably, the supplementary current $C_2$ has a maximum value smaller than that of a current which is provided to the rechargeable battery 20 before the rechargeable battery 20 is fully charged.

The charging cycle for voltage to adjust between $V_1$ and $V_2$ continues until the rechargeable battery 20 is detached from the charging device 10 as shown in FIG. 4 which shows two charging processes carried out during t4-t5 and t6-t7.

It should be noticed that time for the charging process during t4-t5 and t6-t7 is not necessary the same depending on the nature of the rechargeable battery 20 and temperature during the charging processes.

Furthermore, the charging device 10 may further include a power factor correction (PFC) circuit 104 connected between the power source 30 and the charging module 101 for minimizing the input current distortion and making the current in phase with the voltage.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A charging device with a battery management system for a rechargeable battery, comprising:
    a charging module, electrically connected to a power source, for charging the rechargeable battery;
    a power factor correction (PFC) circuit, connected between the power source and the charging module, for minimizing input current distortion and making current in phase with voltage during charging the rechargeable battery;
    a voltage detecting module, for detecting a voltage of the rechargeable battery; and
    a determination module, for instructing the charging module to charge the rechargeable battery with a supplementary current, when the voltage of the rechargeable battery detected by the voltage detecting module reduces to a first predetermined voltage, until the voltage of the rechargeable battery reaches a second predetermined voltage, wherein the voltage of the rechargeable battery is reduced due to self-discharge of the rechargeable battery during standby after being fully charged.

2. The charging device according to claim 1, wherein the rechargeable battery is a lithium battery.

3. The charging device according to claim 1, wherein the second predetermined voltage is equal to the voltage of the rechargeable battery while fully charged.

4. The charging device according to claim 1, wherein the supplementary current has a maximum value smaller than that of a current which is provided to the rechargeable battery before the rechargeable battery is fully charged.

\* \* \* \* \*